United States Patent
Han et al.

(10) Patent No.: US 8,691,116 B2
(45) Date of Patent: Apr. 8, 2014

(54) CONDUCTING POLYMER INK (75) Inventors: Moon Gyu Han, Yongin-si (KR); Jay K. Sperry, Pendleton, SC (US); Samuel T. Ingram, Seneca, SC (US); Stephen H. Foulger, Clemson, SC (US)

(73) Assignee: Clemson University, Clemson, SC (US)

( * ) Notice: Subject to any disclaimer, the term of this patent is extended or adjusted under 35 U.S.C. 154(b) by 874 days.

(21) Appl. No.: 12/293,826

(22) PCT Filed: Mar. 23, 2007

(86) PCT No.: PCT/US2007/007237
§ 371 (c)(1),
(2), (4) Date: Nov. 10, 2010

(87) PCT Pub. No.: WO2007/111996
PCT Pub. Date: Oct. 4, 2007

(65) Prior Publication Data
US 2011/0048772 A1 Mar. 3, 2011

Related U.S. Application Data (60) Provisional application No. 60/785,470, filed on Mar. 24, 2006.

(51) Int. Cl.
H01B 1/00 (2006.01)
B32B 5/16 (2006.01)

(52) U.S. Cl.
USPC .......................................... 252/500; 428/407

(58) Field of Classification Search
USPC .................. 252/500–521.6; 428/407
See application file for complete search history.

(56) References Cited

U.S. PATENT DOCUMENTS

| 4,221,830 | A | | 9/1980 | Dalens et al. |
| 5,189,952 | A | | 3/1993 | Ohmura et al. |
| 5,286,415 | A | | 2/1994 | Buckley et al. |
| 5,389,403 | A | | 2/1995 | Buckley et al. |
| 5,415,893 | A | * | 5/1995 | Wiersma et al. ........... 427/385.5 |
| 5,656,081 | A | | 8/1997 | Isen et al. |

(Continued)

FOREIGN PATENT DOCUMENTS

| EP | 1081548 A1 | 3/2001 |
| EP | 1081549 A1 | 3/2001 |
| JP | 2004-189796 | 7/2004 |

OTHER PUBLICATIONS

Abstract—M. J. Burchell, et al., "Acceleration of conducting polymer-coated latex particles as projectiles in hypervelocity impact experiments," *J. Phys. D: Appl. Phys.*, vol. 32, p. 1719.

(Continued)

*Primary Examiner* — Mark Kopec
*Assistant Examiner* — Jaison Thomas
(74) *Attorney, Agent, or Firm* — Dority & Manning, PA (57) ABSTRACT

Disclosed are conducting polymer inks and methods for forming the inks. The disclosed inks include a dispersion of conductive core/shell nanoparticles. The core/shell nanoparticles include a polymeric core and a shell formed of a conducting polymer. The inks can include a dispersion of the core/shell nanoparticles in a liquid carrier, such as an alcohol. The disclosed inks can be formulated to high viscosities and can be utilized in high-speed printing processes including rotogravure and flexographic printing processes. Products encompassed by the disclosure include polymer devices such as sensors, OFETs, RFID tags, printed circuit board, electrochromic devices, non-volatile memory devices, photovoltaics, and the like.

37 Claims, 8 Drawing Sheets

(56) References Cited

U.S. PATENT DOCUMENTS

| | | | |
|---|---|---|---|
| 6,358,437 | B1 | 3/2002 | Jonas et al. |
| 6,399,675 | B1 * | 6/2002 | Kim et al. ............... 523/206 |
| 6,605,410 | B2 | 8/2003 | Yang et al. |
| 6,652,777 | B2 | 11/2003 | Rapp et al. |
| 6,756,181 | B2 | 6/2004 | Yang et al. |
| 6,794,107 | B2 | 9/2004 | Shimazu |
| 6,833,201 | B2 | 12/2004 | Czerw et al. |
| 6,890,584 | B2 | 5/2005 | Lenders et al. |
| 6,916,595 | B2 | 7/2005 | Fujimaki et al. |
| 7,968,009 | B2 * | 6/2011 | Reynaud et al. ............... 252/500 |
| 2003/0065090 | A1 * | 4/2003 | Kelly et al. ............... 525/63 |
| 2007/0254981 | A1 | 11/2007 | DiMaio et al. |

OTHER PUBLICATIONS

Abstract—Gill, et al., "Novel colloidal polyaniline-silica composites," *J. Chem. Soc., Chem. Commun.*, 1992, p. 108.

Moon Gyu Han and Steven P. Armes, "Synthesis of Poly(3,4-ethylenedioxythiophene)/Silica Colloidal Nanocomposites," *Langmuir The ACS Journal of Surfaces and Colloids*, May 27, 2003, vol. 19, No. 11, p. 4523.

Moon Gyu Han and Stephen H. Foulger, "Crystalline Colloidal Arrays Composed of Poly(3,4-ethylenedioxythiophene)-Coated Polystyrene Particles with a Stop Band in the Visible Regime," *Adv. Matter*, 2004, vol. 16, No. 3, p. 231.

Moon Gyu Han and Stephen H. Foulger, "Preparation of poly(3,4-ethylenedioxythiophene)(PEDOT) coated silica core-shell particles and PEDOT hollow particles," *J. Chem. Soc., Chem. Commun.*, 2004, p. 2154.

Jiang, et al., "Statistical Copolymers with Side-Chain Hole and Electron Transport Groups for Single-Layer Electroluminescent Device Applications", *Chem. Mater*. 12, pp. 2542-2549 (2000).

Shim, et al., "Inkjet Printed Electrochromic Polyaniline Layer for the Fabrication of Electrochromic Devices," *Polymeric Materials: Science & Engineering*, 2006, vol. 94, p. 877.

Kody Varahramyan and Yuri Lvov, "Nanomanufacturing by Layer-by-Layer Assembly," $3^{rd}$ International Symposium on Nanomanufacturing, Cyprus, Nov. 2005.

Han, et al., "Polyaniline coated poly(butyl methacrylate) core-shell particles: roll-to-roll printing of templated electrically conductive structures", *Journal of Materials Chemistry*, vol. 17, (2007), pp. 1-7.

Han, et al., "Crystalline Colloidal Arrays Composed of Poly(3,4-ethylenedioxythiophene)-Coated Polystyrene Particles with a Stop Band in the Visible Regime", *Advanced Materials*, vol. 16, 3 (2004), pp. 231-234.

Han, et al. "Preparation of poly(3,4-ethylenedioxythiophene) (PEDOT) coated silica core-shell particles and PEDOT hollow particles", *ChemComm*, 19, 2154 (2004).

* cited by examiner

CONDUCTING POLYMER INK

CROSS REFERENCE TO RELATED APPLICATIONS

This application claims filing benefit of U.S. Provisional Application Ser. No. 60/785,470, which was filed on Mar. 24, 2006, and is incorporated herein by reference.

FEDERALLY SPONSORED RESEARCH AND DEVELOPMENT

The United States Government may have rights in this invention pursuant to National Science Foundation Grant No. DMR-0236692 and Defense Advanced Research Projects Agency, Grant No. N66001-04-1-8933.

BACKGROUND

Conductive inks have been used for many years in a variety of applications. For instance, conductive inks have been printed on various substrate materials to form conductive circuits as are found in radio frequency identification tags, touch pads, and flexible circuits. Traditionally, conductive inks used for such applications included a dispersion of conductive particles, either metal (e.g., silver) or carbon, in a resin system designed to meet the specifications of both the formation process and the end-use application. Conductive inks have greatly reduced both the monetary and environmental costs associated with these circuits, as the traditional etching process for forming electronic circuits required many separate steps and generated significant hazardous waste problems. U.S. Pat. No. 5,189,952 to Ohmura, et al., U.S. Pat. No. 4,221,830 to Dalens, et al., U.S. Pat. No. 5,286,415 to Buckley, et al., U.S. Pat. No. 5,389,403 to Buckley, et al., and U.S. Pat. No. 5,656,081 to Isen, et al. exemplify several metal and/or carbon particle-containing conductive inks.

Recently, inherently conductive polymers have been examined as a possible replacement for the particles found in more traditional conductive inks. For instance, conductive polymer inks have been suggested for use in forming anti-static coatings, smart windows, corrosion control layers, EMI/RFI shielding, and photovoltaic applications. U.S. Pat. No. 6,358,437 to Jonas, et al. and European Patent Application Publications EP-A 1 081 549 and EP-A 1 081 548 exemplify some recent trends toward forming printable inks through addition of conductive polymers to the ink formulation.

Problems and room for improvement still exist in the art. For instance, traditional conductive inks, incorporating a dispersion of metallic or carbon particles, while often suitable for slower printing processes such as screen-printing, have been difficult to develop for higher speed processes, such as flexographic printing and rotogravure printing. In addition, these more traditional conductive inks often contain environmentally hazardous materials, e.g., volatile organic chemicals (VOC) as solvents such as xylene and toluene.

Similarly, conductive polymer inks have also proven difficult to prepare with suitable viscosities for high-speed printing processes such as flexo/gravure processes. This problem has primarily been attributed to the low solubility of the conductive polymers. In addition, once printed and dried, the conductive polymer inks have often failed to establish suitable conductivities for many applications, and in particular, for printed circuit applications.

What are needed in the art are conductive polymer inks that can be formulated with viscosities suitable for high-speed printing processes. Moreover, conductive polymer inks that utilize environmentally-friendly components, particularly solvents, would be of great benefit. In addition, the ability to print materials and provide a printed, dried ink that exhibits high conductivity would be of great benefit.

SUMMARY

Disclosed in one embodiment is an ink (e.g., a flexographic ink) comprising a dispersion of particles in a carrier liquid. More specifically, the ink can include a dispersion of core/shell polymeric particles in an amount of up to about 50% by weight. The shell of the particles includes a conductive polymer. The particles can generally be in the submicron size. For example, the core can be less than about 500 nm in average diameter and the shell can be between about 10 nm and about 100 nm in thickness. Beneficially, inks as disclosed herein can utilize any carrier liquid. For instance, an ink can include an aqueous carrier liquid such as an alcohol.

The core material can be selected to provide particular characteristics to the ink. For instance, the core can be insulative. The core can also be selected for thermal properties. In one embodiment, the core can have a glass transition temperature between about 25° C. and about 50° C. The core material can also function as a binder for the printed ink.

Inks as disclosed herein can contain additional materials, as well. For instance, the polymeric shell can contain a dopant. In one embodiment, an anchoring material can be between the core and the shell that can be utilized during formation of the inks. In one embodiment, the characteristics of the ink, e.g., viscosity, electrical characteristics, etc., can be controlled through addition of particular materials such as an amount of uncoated core particles.

The present disclosure is also directed to methods of forming inks. For example, a method can include forming a dispersion of the polymeric core particles and then polymerizing a monomer on the surface of the core particles to form a conductive polymeric shell.

An ink formation process can also include forming the core particles via, e.g., an emulsion polymerization process. For example, the polymeric cores can be formed via emulsion polymerization of a methacrylate, and in one particular embodiment butylmethacrylate.

In another embodiment, disclosed are printed substrates including a printed zone at a surface of the substrate that includes the core/shell particles of the disclosed inks. Also disclosed are methods for forming printed zones including the inks. The printed zones can exhibit electrical conductivity and can have a very small line width, for instance less than about 500 nm, or less than about 50 nm, in one embodiment. The printed zones can be treated following the initial printing process to control mechanical and/or electrical characteristics of the printed zone. For instance, the core/shell particles can be deformed and/or ruptured. The printed zones can optionally be subjected to thermal treatments to alter characteristics thereof.

The disclosed inks can be printed on a wide variety of substrates, including polymeric substrates. In one particular embodiment, printed substrates as disclosed herein can be utilized in forming an organic field effect transmitter (OFET).

BRIEF DESCRIPTION OF THE DRAWINGS

A full and enabling disclosure, including the best mode thereof, to one of ordinary skill in the art, is set forth more particularly in the remainder of the specification, including reference to the accompanying figures, in which:

FIG. 11A is a transmission electron micrograph (TEM) of PANI-coated PBMA particles formed as described herein FIG. 11B compares the thermogravimetric analysis of PANI-particles, PBMA particles, and PANI-coated PBMA particles;

FIG. 11C illustrates the zeta potential of starting PBMA core particles and PAN™-coated PBMA particles.

FIG. 12A is an SEM of a printed zone after being thermally treated;

FIG. 12B illustrates the differential scanning calorimetry (DSC) traces of neat PBMA particles and PANI-coated PBMA core/shell particles; and FIG. 12C illustrates the conductivity of printed zones after being heated and compressed.

DETAILED DESCRIPTION

Reference will now be made in detail to various embodiments of the disclosed subject matter, one or more examples of which are set forth below. Each embodiment is provided by way of explanation, not limitation, of the subject matter. In fact, it will be apparent to those skilled in the art that various modifications and variations may be made in the present disclosure without departing from the scope or spirit of the disclosure. For instance, features illustrated or described as part of one embodiment, may be used in another embodiment to yield a still further embodiment. Thus, it is intended that the present subject matter cover such modifications and variations as come within the scope of the appended claims and their equivalents.

The present disclosure is directed to conductive polymer inks that can be formulated with a predetermined solids content and viscosity so as to be suitable for use in a printing process, and in one particular embodiment, in a high-speed printing process such as flexographic printing or rotogravure printing. In addition, the disclosed inks can be economical and ecologically friendly, as they can be formulated from relatively inexpensive starting materials and without the addition of any hazardous VOC solvents.

The conductive polymer inks include a dispersion of core/shell nanoparticles in a carrier fluid. More specifically, the core/shell nanoparticles include a polymeric core and an electrically conductive polymer shell on the core.

Polymeric materials that can be utilized in forming the core of the core/shell nanoparticle can generally be any polymeric material that can be formed to the size specification desired for the ink, discussed further below. For example, the colloidal particles can be formed of a polymer resulting from the polymerization of monomers including methacrylate, aromatics such as styrene, acrylate, acrylamide, acrylonitrile, derivatives thereof, copolymers thereof, and the like. A non-limiting listing of possible materials for forming the polymeric core of the disclosed core/shell nanoparticles can include, for example, poly(methyl methacrylate), poly(ethyl methacrylate), poly(butyl methacrylate), poly(benzyl methacrylate), polyacrylate, polyethylene glycol), poly(hydroxyethyl methacrylate), as well as aromatic vinyl polymers such as polystyrene, poly(vinyl toluene), poly (divinyl benzene), and the like In one particular embodiment, the core can be formed of an insulating polymeric material. Insulating polymeric materials can be preferred, in one embodiment, due to their availability, economy, and ability to be processed relatively easily to form the colloidal nanoparticles.

According to one embodiment, the core can be formed of a polymeric material having a predetermined glass transition temperature ($T_g$). For example, the polymeric material forming the core can have a $T_g$ near to or less than the temperature at which the ink is expected to be processed during the printing process. For instance, when the polymeric material of the core has a $T_g$ lower the printing temperature, the core of the core/shell nanoparticles can soften and deform during the printing process and improve fusion between adjacent nanoparticles and thus improve the binding characteristics of the ink without losing electrical conductivity. In such an embodiment, the ink can exhibit excellent binding characteristics without the addition of an additional binder to the formulation. More specifically, the polymeric material that forms the polymeric core of the core/shell nanoparticles can function as a binding agent (also referred to herein as a binder) in the disclosed inks and can aid in adhering the ink to a substrate following a printing process.

Optionally, the polymeric material forming the core of the nanoparticles can exhibit a relatively low glass transition temperature. For example, the polymeric core can have a $T_g$ of between about 25° C. and about 50° C. For example, the polymeric core can have a $T_g$ of about 40° C.

The core of the core/shell nanoparticles can generally be less than about 500 nm in average diameter. In one embodiment, the core of the nanoparticles can be between about 20 nm and about 400 nm, for instance between about 100 nm and about 300 nm, or, in another embodiment, about 200 nm. In one embodiment, the core nanoparticles of the ink can all be quite similar in size, for instance within about 5% of one another in size. Accordingly, the disclosed ink formulations can, in this embodiment, include monodisperse core/shell nanoparticles.

The polymeric core can be formed according to any suitable nanoparticle formation process. For example, one or more monomers can be polymerized and the nanoparticles can be formed according to self-assembly or directed-assembly processes such as are generally known to those of ordinary skill in the art including emulsion polymerization (e.g., micro-emulsion and mini-emulsion), polycondensation polymerization, radical polymerization, suspension- and dispersion-precipitation polymerization, and the like.

Figure 1:
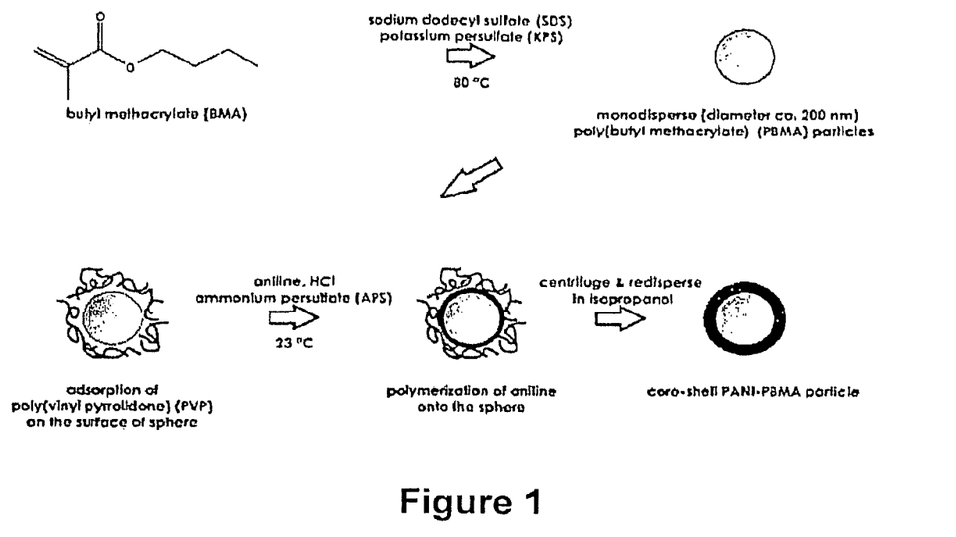
FIG. 1 schematically illustrates one exemplary method for forming the core/shell particles of the disclosed inks.

FIG. 1 illustrates one exemplary flow diagram for forming the core/shell nanoparticles. According to this particular embodiment, a monomer, e.g., butyl methacrylate (BMA) can be polymerized according to a suitable process. For instance, BMA can be polymerized according to a typical emulsion polymerization process in the presence of sodium dodecyl sulfate (SDS, a surfactant) utilizing a suitable polymerization initiator such as potassium persulfate (KPS). Many suitable emulsion polymerization reagents are known to those of skill in the art and as such are not presented in detail herein.

As previously mentioned, the core nanoparticles can be of any suitable size, though generally they will be less than about 500 nm in diameter. The preferred size of the core nanoparticles for any particular embodiment can generally depend upon the preferred printing process for which the ink is intended as well as upon the final application of the printed ink. Control of the core particle size can be affected through selection of the monomer as well as selection of the formation process and process parameters. For instance, when considering the formation of the core particles according to an emulsion polymerization process, it has been found that monodisperse suspensions can be formed with the average particle size of the suspensions strongly dependent upon the amount of monomer fed to the process. For example, in one particular embodiment, an emulsion polymerization process can be utilized including about 10 wt. % addition of monomer to the reaction vessel. This process can form monodisperse polymeric nanoparticles of about 140 nm. The same basic process, but for a higher weight percentage monomer added to the reaction vessel, i.e., about 50 wt. %, however, can form monodisperse polymeric nanoparticles of about 230 nm. Moreover, this relationship appears to be linear over the range from about 10 wt. % to about 50 wt. % monomer feed. The particle size can also be dependent on the amount of surfactant, initiator, and/or temperature utilized during the formation process.

According to the present disclosure, the nanoparticles can include an outer shell formed of a conductive polymer. The outer shell can be formed according to any suitable process. For instance, following formation of an aqueous suspension or dispersion of the polymeric core nanoparticles, one or more monomers can be polymerized on the surface of the core nanoparticles to form the conductive polymer shell of the nanoparticles. Generally, in order to ensure adequate coating, a dispersion can include the core nanoparticles at a weight percentage of up to about 42%. For instance, an aqueous dispersion including the core nanoparticles at a weight percentage of between about 10% and about 30% can be formed and then the monomers can be polymerized on the surface of the cores to form the conductive shells.

To prevent flocculation of the core nanoparticles, the dispersion can include a steric stabilizer. Many suitable stabilizers are known in the art. For instance, when considering an aqueous dispersion, exemplary stabilizers can include, without limitation, poly (N-vinylpyrrolidinone) (PVP), poly (ethylene oxide) (PEO), hydroxylpropyl cellulose, methyl cellulose, polystyrene sulfonate, poly (vinyl alcohol), and the like.

Referring again to FIG. 1, a stabilizer such as PVP can be adsorbed at the surface of the core particle. For instance, a shell synthesis process can be carried out at a low pH environment, and the presence of the stabilizer at the surface of the core particle can prevent degradation of the core as the shell is formed. In one embodiment, a stabilizer material can serve as an anchor molecule between the core and the shell. For example, a monomeric or polymeric material can be adsorbed or otherwise bound to the surface of the core particle, and the material that will form the shell can bind to this anchor material.

Any particular stabilizer and/or anchoring material can be selected based upon the core material, the shell material, process conditions, and the like.

Monomers that can be polymerized onto the core nanoparticles can include those that, upon polymerization, can exhibit inherent conductivity. For instance, a variety of copolymers and/or derivatives of polyaniline (PANI), polypyrrole, polythiophene, poly (3, 4-ethylenedioxythiophene) (PEDOT), and poly(p-phenylene vinylene) are known in the art and can be polymerized on the core nanoparticles according to the present disclosure.

Polymerization of the monomers that form the shell on the core/shell nanoparticles can be carried out according to any suitable process. For instance, a solution of the dissolved monomers can be combined with the dispersion of core polymeric nanoparticles. Upon addition of a suitable polymerization initiator to the mixture, the dissolved monomer can polymerize on the surface of the core nanoparticles. For instance, an aniline salt such as aniline hydrochloride can be polymerized from solution upon the addition of an oxidative polymerization initiator such as ammonium peroxydisulfate (APS). Polymerization initiators for any particular monomer are well known in the art, and thus need not be discussed at length herein (e.g., polymerization of polypyrrole by use of $FeCl_3$, etc). Preferred polymerization initiators of any particular system can depend at least in part upon the oxidation potential of the initiator and the polymerization potential of the of the monomers, among other factors. Other exemplary materials and systems for forming conductive core/shell nanoparticles such as those described herein have been described, for instance by M. G. Han and S. H. Foulger, *Adv. Mater.* 2004, 16, 231 and M. G. Han and S. H. Foulger, *Chemical Communications*, 2004, 19, 2154, both of which are incorporated herein in their entirety by reference thereto.

The shell thickness formed on the polymeric core can be between about 10 nm and about 100 nm in one embodiment. In another embodiment, the shell thickness can be between about 25 nm and about 75 nm, for instance about 50 nm. The shell thickness can generally be controlled through control of the total feed of the monomer to the process. FIG. 1 includes a shell formation process including a first adsorption of a PVP stabilizer on the PBMA core followed by polymerization of a conductive polymer shell on the surface of the core.

In one embodiment, following formation of the core/shell nanoparticles, they can be separated from the other constituents utilized in the formation process and redispersed in a carrier liquid to form the conductive polymer inks as disclosed herein. For instance, following polymerization of the conductive polymer on the surface of the core, the core/shell nanoparticles can be purified as shown in FIG. 1, for example via centrifugation of the product or via freeze-drying. In an exemplary freeze-drying process, the solvent is crystallized, resulting in separation of the solutes (the core/shell nanoparticles) from the solvent. The crystalline solvent can then be removed by sublimation under vacuum. In the illustrated embodiment, the purification process can remove materials used to stabilize the core particles prior to and during formation of the shell. In other embodiments, however, and as discussed above, the stabilizing materials can remain as a portion of the core/shell particles.

Separation of the core/shell nanoparticles from the formation liquid may not be necessary. For instance, in certain embodiments, the liquid carrier of the core/shell nanoparticle disbursement can be included as a component of the conductive polymer ink formulation, in which case a separation step need not be carried out. According to such an embodiment, the solids content of the ink may be altered, through removal or addition of carrier liquid, or other characteristics of the ink can be developed, for instance through addition of one or more additives as discussed further below.

The conductive polymer inks include a dispersion of the core/shell nanoparticles in a carrier liquid. Beneficially, the carrier liquid can be any of a wide variety of liquid vehicles, and need not be limited to those that can act as a solvent for the conductive polymers, as is the case for many previously known conductive polymer inks. Moreover, in one preferred embodiment, the disclosed inks can be prepared without the inclusion of hazardous additives, and in particular hazardous VOC solvents such as toluene, xylene, and the like, as are currently found in many conductive inks.

In one particular embodiment, the carrier liquid can be aqueous. For example, the carrier liquid can be water or can be an alcohol. For instance, methanol, ethanol, and/or isopropanol can be utilized as a carrier vehicle for the conductive polymer inks. Alcohols can provide benefits in addition to their benign potential as environmental hazards, as well. They can also exhibit low surface tension (for example, less than about 25 mN/m) and as such the ink can effectively wet and spread on low surface energy substrates, such as polyester substrates, for example. Alcohol-based inks can also facilitate drying properties as are preferred for high-speed printing processes, and in particular, for flexographic printing processes.

The disclosed inks can include any of a variety of additives as are generally known in the art. For example, the inks can include addition'al liquid carriers, such as water and/or a mixture of alcohols, for example. A combination of liquid carriers can be utilized, for instance, to adjust final viscosity and/or surface tension of the ink.

An ink can include one or more colorants as are generally known in the art. Typical of the many known colorants as may be employed in the disclosed inks are: Diarylide Yellow, Phthalo Blue, and Barium Lithol Red. In one embodiment, an ink formulation can include one or more plasticizers, which can increase the flexibility of the ink and assist in maintaining adhesion of the ink to the substrate. Anti-foaming agents can be included in the inks to improve the printing process. Other additives can include one or more waxes, such as polyethylene wax, polyethylene oxide wax, polypropylene wax and fatty amides, as are generally known in the art. Waxes can improve characteristics of the printed product such as scuff resistance, rub resistance, and abrasion resistance. Silicone can be added to the ink formulation in order to increase slip of the printed materials. Conversely, it may be preferred in some embodiments to include silica in the ink formulation to reduce slip of the printed materials. Additives to the ink formulation can also include materials to control the rate of drying of the ink. For instance, glycerin can be included to prevent premature drying or coagulation of the ink.

There are many surfactants known in the art that can be included in the ink formulations. An exemplary listing, without limitation, of surfactants that can be included in the inks can include, non-ionic, amphoteric or anionic surfactants such as SURFYNOL™ surfactants, available from Air Products Corporation; SYNPERONIC™ surfactants, available from UNIQEMA; ZONYL™ surfactants, available from the DuPont Corporation; FLUORAD™ surfactants, available from the 3M Corporation; PLURONIC™ surfactants, available from BASF; Tegoglide™ and Tegowet™ surfactants, available from Goldschmidt; LOMAR™ surfactants, available from the Hinkel Corporation; AEROSOL™ surfactants, available from American Cyanamid; DOWFAX™ surfactants, available from Dow Corning; and NIAPROOF ANIONIC™ surfactants, available from Niacet.

Disclosed inks can include materials in the dispersion that can be utilized to tune the conductivity of the printed inks. For example, disclosed inks can include an amount of an electrically insulating colloid, and the addition of such can result in a decrease of the conductivity of a printed area through a reduction in the density of conductive paths accessible to mobile charge. In one embodiment, an ink can be formulated to include uncoated insulative core particles in the dispersion. The addition of uncoated core particles can decrease the content of the conductive polymer in the ink while maintaining the desirable printing characteristics, viscosity, etc. For example, a printed zone of an ink including a dispersion of the disclosed core/shell particles can have a conductive polymer content of between about 40% and about 60% by weight of the dried ink and can exhibit a conductivity of about $0.5\Omega^{-1}$ $cm^{-1}$. A decrease in the conductive polymer content of the ink to about 20% by weight through addition of uncoated core particles to the ink can result in a modest order of magnitude reduction in conductive to about $2.2\times10^{-2}\Omega^{-1}$ $cm^{-1}$. A further decrease in the amount of conductive polymer to about 10 wt. % can result in a printed zone conductivity of about $1\times10^{-4}\Omega^{-1}$ $cm^{-1}$, as the percolation threshold becomes traversed and the volume fraction of the conductive polymer becomes insufficient to provide continuous electrical paths through the printed material.

Similarly, conductive particles may be added to the disclosed inks to increase the conductivity of the printed materials. For example, graphite, carbon nanotubes, carbon black, carbon nanofiber, metal powder, or the like may be added to increase the conductivity of the printed inks.

As mentioned above, the polymeric material used in forming the core of the core/shell nanoparticle can serve as a binder upon printing of the disclosed conductive inks. Accordingly, in certain embodiments, no further binding additive is required. In other embodiments, to further facilitate binding properties of the inks, however, additional binders can be included. For instance other binders including any of a wide variety of known latex binders can be included in the conductive polymer inks. Other binders can include resins such as acrylic polymers, polyamides, nitrocellulose polymers, or cellulosic resins such as cellulose acetate propionate and hydroxylpropyl cellulose. Binding agents can form physical and/or chemical bonds between the components of the ink as well as between the ink and the substrate to which the ink is applied. For instance, binding agents, including the polymeric material forming the core of the disclosed core/shell nanoparticles can form chemical bonds including hydrogen, ionic, or covalent bonds with the substrate material and/or other materials in the inks, including bonding between like or unlike binding agents. The binding agents can also form physical bonds with other materials including the substrate. For instance the binding agents can penetrate microscopic physical deformations of the substrate and improve binding of the ink to the substrate. The particular types and density of bonds formed between binding agents and other materials will depend upon the nature of the binding agent and the other materials contained in the ink, as well as the nature of the substrate itself.

The disclosed conductive polymer inks can be formulated with up to about 50% solids content and can have a viscosity, surface tension, and shear rate so as to be suitable for any desired printing process. For instance, the disclosed inks can be utilized for printing according to spin-cast, spray-coating, ink-jet, laser, screen-printing, imprint/pad printing, knife coating, off-set lithography, and the like. In one preferred embodiment, the disclosed inks can be utilized in high-speed printing processes including rotogravure and flexographic printing processes. For example, the viscosity of an ink as described herein developed for use in a high-speed printing process can have a viscosity in one embodiment of less than about 100 mPaS, or less than about 70 mPaS in another embodiment. For instance, an ink as described herein can have a viscosity of between about 3 and about 50 mPaS, or between about 8 and about 12 mPaS, in another embodiment. Specific determinations as to solids content and corresponding viscosity for any particular type of ink are well within the capabilities of one of ordinary skill in the art.

If desired, the characteristics of the printed product itself can be controlled through predetermination of the solids content of the ink. For example, the thickness of the line formed during a printing process, and in particular, during a high-speed printing process, could be systematically controlled by controlling the solids content of the ink.

Figure 2:
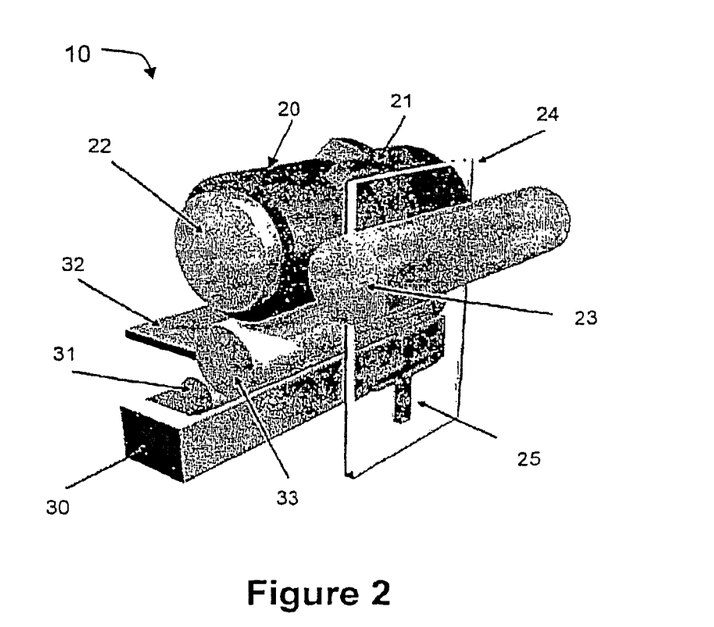
FIG. 2 is a schematic of a flexographic printing process as may be utilized in one embodiment of the present disclosure.

In one embodiment, disclosed inks can be printed according to a flexographic printing process as in generally known in the art. FIG. 2 schematically illustrates one embodiment of a flexographic printing process 10 as may be used with the disclosed inks. According to the illustrated printing technique, an ink as disclosed herein can be supplied in an ink fountain 30. A fOuntain roll 31 can deliver the ink to an anilox inking roll 33. The system can include a doctor blade 32 to provide a consistent layer of ink across the anilox inking roll 33.

A flexographic plate 20 including a print image thereon 21 can be mounted on a plate cylinder 22. Any method as is generally known in the art can be utilized to form a print image 21 on a flexographic plate 20. For example, a digital plate-making process can be utilized in which an opaque carbon mask is subjected to laser ablation to create the image area. Following initial image creation, a UV face exposure can be used to set and harden the image area. The flexographic plate 20 including the print image 21 can the thermally processed to complete the plate 20. U.S. Pat. Nos. 6,916,595; 6,794,107; 6,756,181; and 6,605,410 all of which are incorporated herein by reference, disclose flexographic plates and methods of forming same as may be utilized with the disclosed inks. It should be understood, however, that the disclosed inks are not limited to use with such plates. Beneficially, the disclosed inks can be formulated for use with many printing processes known in the art.

The print image 21 can be wetted with the conductive colloidal ink applied from the anilox inking roll 33. The print image 21, which is a raised surface, can then be pressed onto the substrate 24 backed by an impression cylinder 23 to form a printed image 25 on the substrate 24.

Disclosed inks can be printed onto any substrate as is generally known in the art including rigid or flexible substrates, polymer or cellulose substrates, natural or synthetic substrates, laminates, and the like. Substrates that can be printed with the disclosed inks can be translucent, transparent, or opaque, as desired. Examples of substrate materials can include, without limitation, polyester (e.g., polyethylene terephthalate), paper, woven or non-woven fabric, glass, polyolefins (e.g., polypropylene), polycarbonates, polymeric composites (e.g., fiberglass), and so on.

In one particular embodiment, the disclosed conductive polymer inks can be utilized in forming printed circuits, and in particular, can be utilized in forming all-polymer transistors (e.g., organic field effect transistors (OFET)). For example, the disclosed inks can be printed on flexible polymeric substrates with a line width of as little as about 35 micrometers ($\mu m$). The disclosure is not limited to the formation of such line widths, however, and in other embodiments, much greater or smaller line widths are possible. For instance, and depending primarily upon the plate, the presently disclosed conductive inks can be printed with a line width down to about 1 $\mu m$, if desired.

Even at extremely small line widths, disclosed inks can exhibit high conductivities following a printing process. For example, a single-pass print of the disclosed inks can print a conductive line on a PET substrate having a width of as little as about 35 $\mu m$ that can exhibit a predetermined conductivity of between about $1\times10^{-3}$ S/cm and about 100 S/cm. For example, an all-organic printed circuit can exhibit a conductivity of about 25 S/cm.

The disclosed inks can be beneficially utilized in one embodiment in high speed roll-to-roll printing processes to form high resolution interdigitated electrode (IDE) patterns on a substrate. Other industrial applications of the disclosed conductive polymer inks can include formation of identification components (e.g., RFID), sensors, memory devices, displays (e.g., electrochromic devices), photovoltaic cells, organic light emitting diodes (OLED), and the like.

One benefit of the core/shell construction of the disclosed inks is the capability, due to the construction and materials of the particles, to decouple the conductive properties of the inks from the thermomechanical properties of the inks. More specifically, the shell material can provide the primary conductive properties
of the composite core/shell nanoparticles, and the core material can provide the primary thermal and mechanical properties to the composite core/shell nanoparticle.

According to one embodiment, the printed materials can be treated, and the thermophysical properties of the printed zone can be altered through a treatment that primarily effects the core material of the particles, while having little effect on the electrical properties of the printed zone. For instance, upon heat and/or pressure treatment of a printed zone, the geometric characteristics of the core/shell particles can be altered from the initial spherical shape to a more planar shape. The treated zone can exhibit improved mechanical characteristics, for instance increased abrasion resistance, while the electrical characteristics can remain little changes. Thus, the core material can act as a binder for the printed ink. While not wishing to be bound by any particular theory, it is believed that such treatment can deform the core/shell particles while maintaining their structural integrity, can deform the particles through splitting or rupturing of the shell of the particles, or some combination of both, depending upon the specific materials included in the core/shell particles as well as the specific processing conditions.

Similarly, the conductivity of a printed pattern can be influenced by the morphology of the plurality of the particles that is directly influenced by the printing method used. For example, a quick contact printing method with little pressure applied to the ink as it is printed can be used to develop a printed pattern exhibiting a significant level of porosity. In particular, the individual particles can be relatively loosely packed together and can include regions that do not contribute to charge transfer. Thus, the printed pattern can exhibit relatively low conductivity. In contrast, the same ink can be printed under a higher pressure printing process and the printed pattern can exhibit a significant increase in conductivity due to the tighter packing of the particles and less porosity of the printed pattern.

The disclosure may be more clearly understood with reference to the Examples set forth below.

EXAMPLE 1

Poly(butyl methacrylate) latex nanoparticles were synthesized according to an emulsion polymerization method. Nanoparticles of various sizes were synthesized in separate runs, with sizes varying between about 100 nm and about 300 nm. The nanoparticles were presented as an aqueous monodispersion at concentrations varying between about 10% to about 30% by weight.

Figure 3:
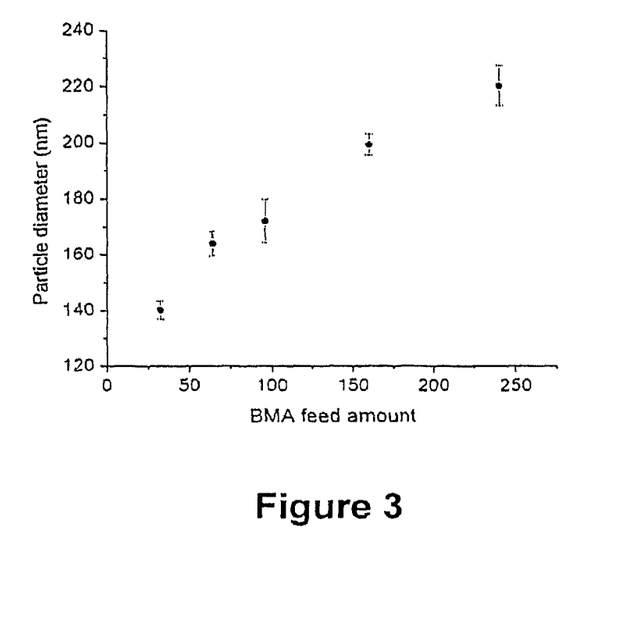
FIG. 3 graphically illustrates the relationship between monomer feed amount and average particle size obtained in one embodiment of a polymer core formation process as herein described.

Monodisperse PBMA latex was synthesized by emulsion polymerization of BMA using sodium dodecyl sulfate (SDS) as a surfactant. SDS (0.1-1 gram) in 320 g of de-ionized water was added to a reaction vessel equipped with a stirrer and a nitrogen inlet. Following continuous stirring for 1 h, BMA monomer was injected in various amounts as illustrate in Table 1, below. The reaction vessel was heated to 80° C. under nitrogen purge followed by the introduction of 0.33 g of potassium persulfate (KPS) polymerization initiator dissolved in 10 g of water. Polymerization was allowed to proceed for 6 hours, following which the contents were allowed to cool to room temperature. The observed particle diameter from scanning electron microscopy (SEM) for various runs of the core formation process is illustrated in FIG. 3.

TABLE 1

| Sample | SDS (gram) | BMA (gram) | Particle Diameter (nm) |
| --- | --- | --- | --- |
| A | 0.4 | 30 | 139.2 ± 2 |
| B | 0.4 | 65 | 158.7 ± 5 |
| C | 0.4 | 100 | 175.8 ± 6 |
| D | 0.4 | 160 | 198.9 ± 4 |
| E | 0.4 | 250 | 230.6 ± 7 |

Figure 4:
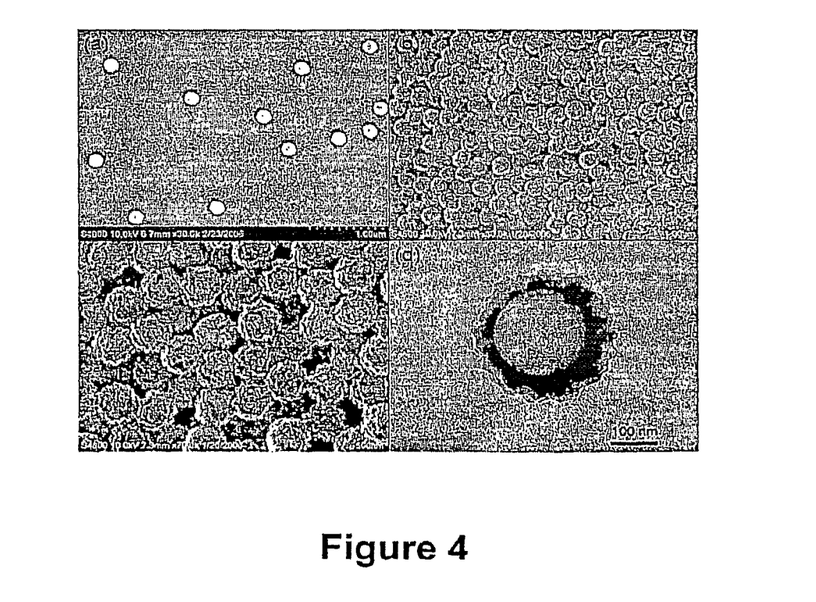
FIGS. 4A-4D are images of: poly(butyl methacrylate) (PBMA) core particles (FIG. 4A), polyaniline(PANI)-coated PBMA particles (FIG. 4B, 4C), and a single PANI-coated PBMA core-shell particle (FIG. 4D) formed in the examples described herein.

FIG. 4A is an SEM of the monodispersed core particles of Sample D of Table 1.

Following formation of the core nanoparticles, Sample D PBMA cores were coated with polyaniline to form core-shell particles for dispersion in forming conductive polymer inks. To protect the PBMA core nanoparticles from flocculation in low pH synthetic conditions, poly (N-vinylpyrrolidinone) (PVP) was dissolved and allowed to absorb onto the latex surface. In particular, to 400 ml of PBMA nanoparticle dispersion, 400 ml water was added to dilute the dispersion and the aqueous polymeric stabilizer solution (10-100 g of PVP dissolved in 400 ml water) was then added.

78 g of aniline-HCl (aniline in 0.2M-1 M hydrochloric aqueous solution) was dissolved in the reaction vessel. 124 g of ammonium peroxydisulfate (APS) oxidant pre-dissolved in 400 ml water was added while stirring and polymerization of the aniline proceeded at room temperature. Following 3 hours of reaction, the resulting core-shell nanoparticles were purified by centrifugation. FIGS. 4B and 4C are SEMs of increasing magnitude of the core/shell nanoparticles following formation. As can be seen, the core/shell nanoparticles have a high surface area nodular surface, which can be advantageous in many embodiments. The TEM of a single nanoparticle (FIG. 4D) clearly indicates the outer shell formed on the PBMA core particle.

EXAMPLE 2

Core/shell nanoparticles formed as described above in Example 1 were dispersed to form conductive polymer inks. The core-shell nanoparticles were dispersed in isopropanol (IPA) by simply introducing an amount of the nanoparticles into the IPA with stirring. The use of isopropanol (surface tension, 20.93 mN/m) lowered the surface tension of the ink and allowed the ink to effectively wet and spread on a low surface energy substrate (e.g., PET, which has a surface energy of about 44 dyne/cm). Use of isopropanol also facilitated the drying properties of the ink, which can be important for flexographic printing.

Four different ink formulations were prepared as described in Table 2, below, and printed according to a flexographic printing process. (All amounts in Table 2 are present as weight percentage.)

TABLE 2

| Ink sample | Core-shell particle | IPA | water | PVP | glycerin | surfactant |
| --- | --- | --- | --- | --- | --- | --- |
| 1 | 26.5 | 60 | 11 | 0.5 | 2 | 0 |
| 2 | 35 | 58 | 4.5 | 0 | 2 | 0.5 |
| 3 | 20 | 65 | 11 | 2 | 2 | 0 |
| 4 | 26.5 | 60.5 | 11 | 0 | 2 | 0 |

The formulations each included an amount of water as a co-solvent and plasticizer. The printing properties of each ink were controlled by adding a small amount of surfactant. A small amount of glycerin was also added to prevent drying of the ink before printing.

Figure 5A:
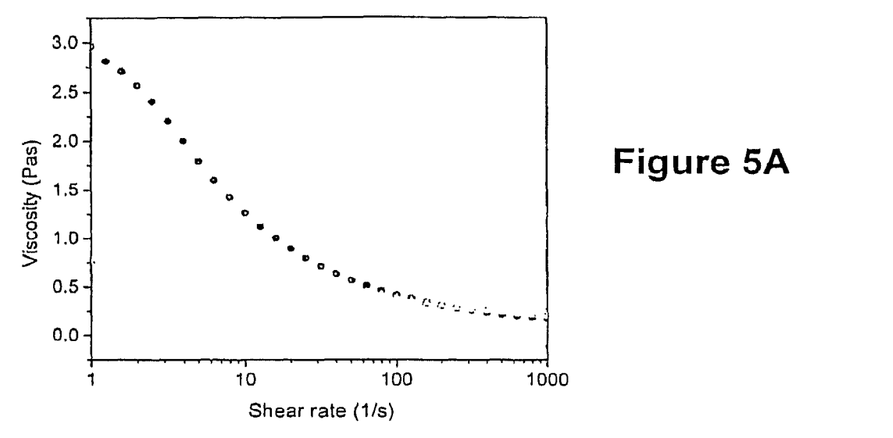
FIG. 5A graphically compares variation in viscosity with shear rate for two exemplary conductive polymer inks.
Figure 5B:
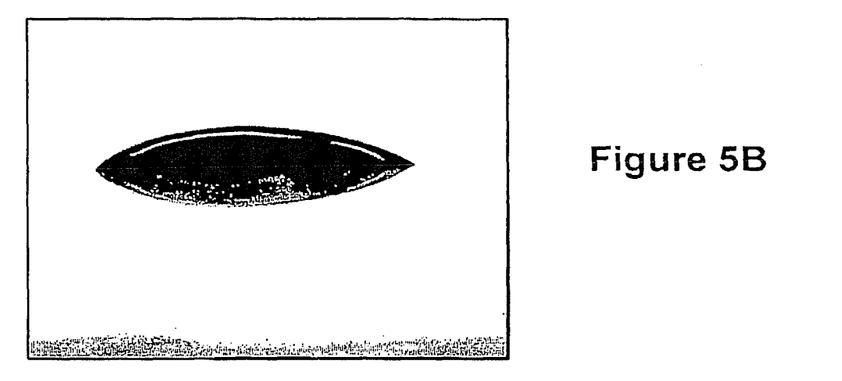
FIG. 5B is a photograph of a single drop of an exemplary conductive polymer ink as can be utilized in determining contact angle of the ink.

FIG. 5A illustrates the ink viscosity as a function of the shear rate. In the Figure, two different inks with same solid content (26.5% by weight) were compared. In particular, ink 1 (triangles), including 0.5 wt % of PVP polymeric binder, was compared to ink 4 (circles), which used only isopropanol as a vehicle, and no additional PVP binder. Note that the viscosity could be controlled at low shear rate by adding a small amount of the binder to help the printing performance. At high shear rate (more than 100/sec), the viscosity of the two inks was almost the same. FIG. 5B illustrates a single drop of ink #4 on PET substrate for measurement of contact angle. Contact angle of the ink drop on the PET was found to be 31.2°. This value is almost identical to commercial flexographic inks (32.4°).

Figure 6:
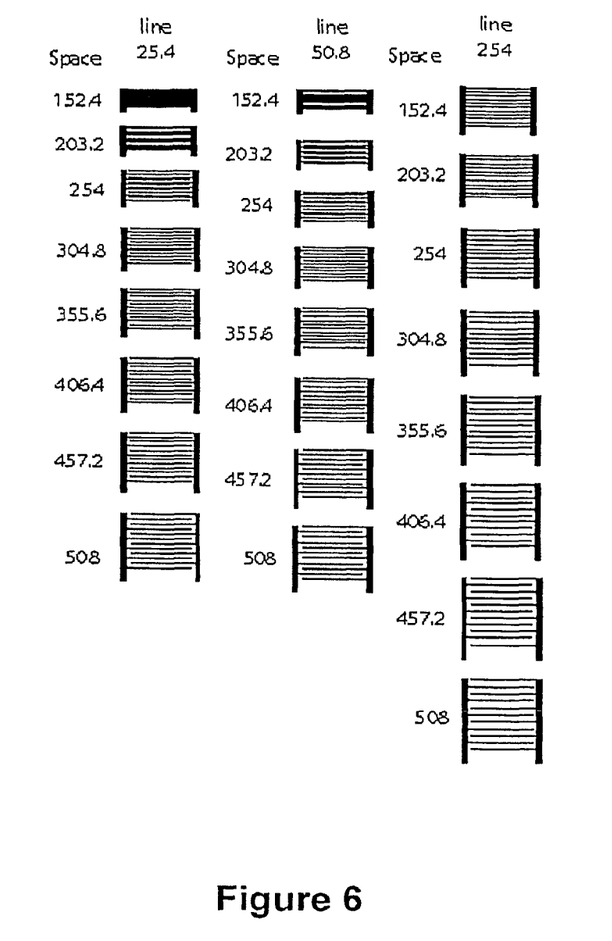
FIG. 6 illustrates a target design for flexographic printing of exemplary inks as described in the example section.
Figure 7:
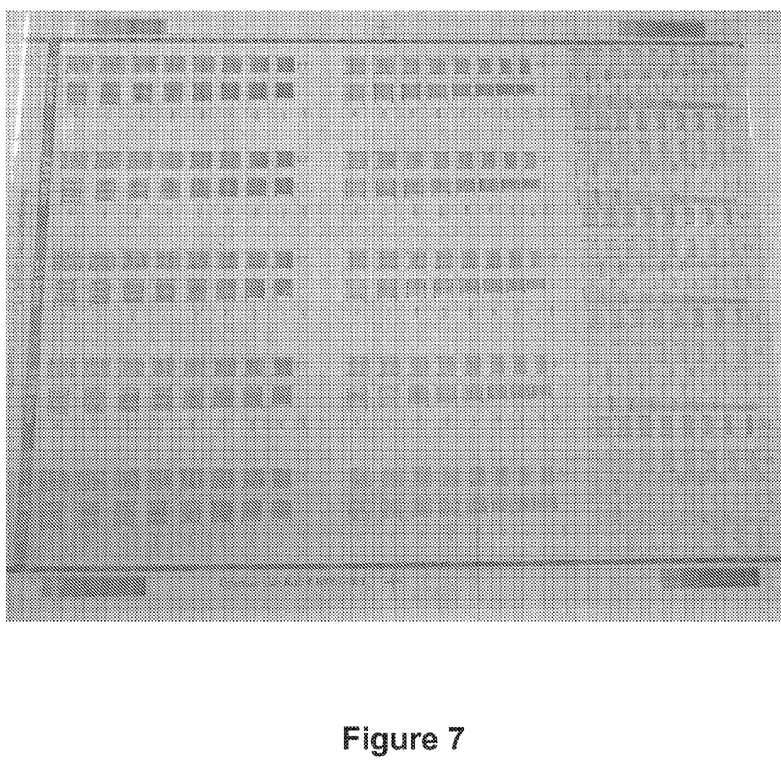
FIG. 7 is a photograph of the flexographic printing results for an exemplary conductive polymer ink.

FIG. 6 is the target design to which the ink samples were formed. Units of the design are presented as micrometers (μm). FIG. 7 is a photograph of the printed pattern obtained via a flexographic printing process using ink #4.

Various line width, line gap, and anilox roll cell volume were tested. The numbers on the far left (varying from 3.01 to 0.95 bcm) is the cell volume, with higher volume resulting in increased print thickness.

Figure 8A:
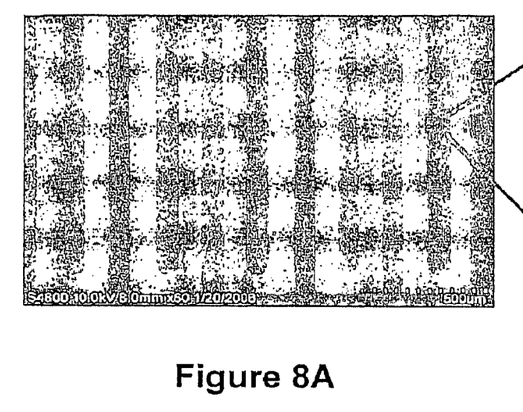
FIGS. 8A-8B are scanning electron micrographs (SEMs) of a portion of a single printed pattern section of a print of the target design of FIG. 6 including an interdigitated test figure flexographically printed with a line width of about 85 μm (FIG. 8A), and showing the morphology of the core/shell particles within a printed zone (FIG. 8B)
Figure 8B:
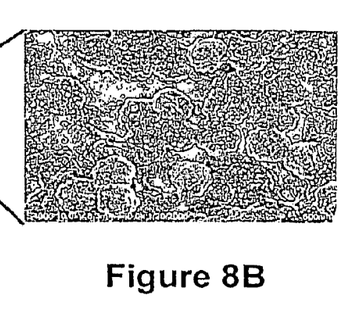
Figure 9:
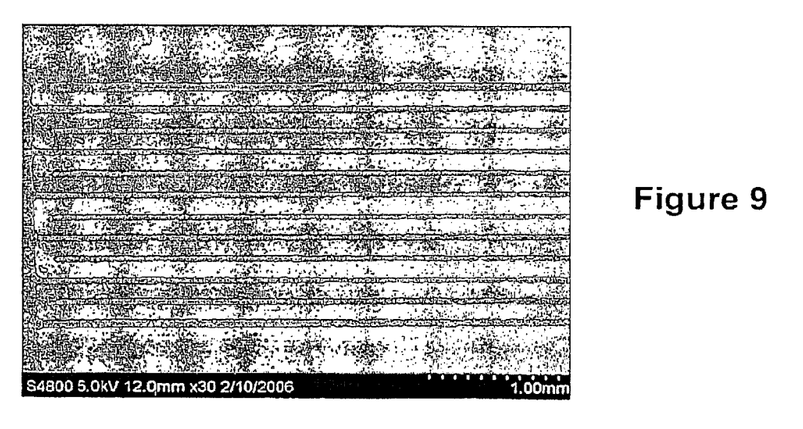
FIG. 9 is an SEM of another printed pattern section of a print of the target design of FIG. 6.

FIGS. 8A and 8B are increasingly magnified views by scanning electron microscopy (SEM) of a section of a printed pattern. The pattern is from the target design of FIG. 6 and includes 152.4 micron space and 50.8 micron line thickness. FIG. 9 is a view of another printed pattern taken from the target design of FIG. 6 having a 152.4 micron space and 25.4 micron line.

EXAMPLE 3

PBMA particles were synthesized according to an emulsion polymerization process with particle size between about 100 nm and about 300 nm. In a typical synthesis run, 0.4 g of sodium dodecyl sulfate (SDS) was added to 320 g of deionized water in a reaction vessel equipped with stirrer and a nitrogen purge. After stirring for 1 hour, 160 g of butyl methacrylate monomer was injected into the vessel and the vessel was heated to 80° C. Polymerization was initiated by the addition of 0.33 g potassium persulfate (KPA) that was dissolved in 10 g of deionized water. Polymerization was allowed to proceed for 6 hours before cooling to room temperature. Observed particle diameter from TEM was 199±4 nm. The observed $M_w$ of the colloidal particles was 221 K and the polydispersity index (PDI) was 2.08.

To protect the formed PBMA particles from flocculation in the low pH synthesis conditions, poly(N-vinyl pyrrolidinone) (PVP, $M_w$=360,000) was dissolved into the suspension and allowed to absorb onto the particles. In 400 ml of the latex dispersion, 400 ml of deionized water was added to dilute the dispersion and then a PVP solution (40 g PVP in 400 ml water) was added. To this dispersion, 78 g of aniline-HCL was dissolved, 91.2 g of ammonium peroxydisulfate (APS, initially dissolved in 400 ml water) was added to initiate the polymerization at room temperature. The reaction was allowed to proceed for three hours, following with the resulting core/shell particles were purified by centrifugation.

To form the colloidal ink, the cleaned core/shell particles were re-dispersed in isopropanol (IPA) and stirred. IPA was employed as the majority solvent due to its ability to allow the ink to effectively wet and spread on the poly(ethylene terephthalate) (PET) printing substrate. The majority solvent was IPA, but water was utilized as a co-solvent and plasticizer. In addition, glycerin was added to the ink to control the drying rate of the printed ink. The composition of the ink was core/shell particles (26.5% w/w), IPA (60.5% w/w), water (10% w/w), and glycerin (2% w/w).

Print runs were done on a Comco International Captain 6 station 10 inch narrow web inline press. A digitally image DuPont DFH plate with a caliper of 0.17 cm was thermally developed unit a DuPont FAST processor. The test image was an interdigitated template with various line widths, ranging from 25.4, 50.8, 254 and 512 µm, and spaces, ranging from 152.4, 203.2, 254, 304.8, 355.6, 406.4, 457.2 and 508 µm. Plates were mounted on a Mark Andy manual plate mounter using 3 M EH1715 cushion mounting material. The inline infrared drying station, measuring 61 cm in length and containing six 700 watt bulbs, was maintained at 80° C. during the runs.

A modified ink pan was used that required about 700 ml of the conductive ink. A banded anilox roll was employed that have five bands 1.75 inches wide with varying cell depths and line rulings. The bands measured 0.95, 1.58, 2.1, 2.61, 3.01 bcm in-2. The substrate was 0.25 mm thick PET sheet and was printed at 15.25 m/min.

Figure 11:
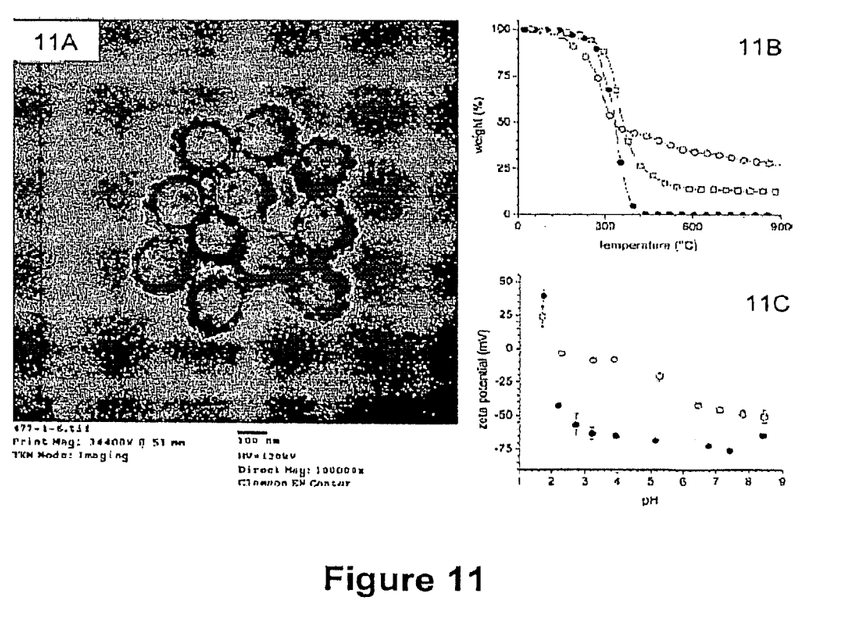

FIG. 11A is a TEM image of PAN™-coated PBMA particles formed according to the process. For electron microscopy imaging, the coated particles were dropped on Formvar™ carbon stabilized copper grid (Ted Pella Inc., 01753-FXI) and dried at room temperature under a watch glass. The samples were imaged using a Hitachi H-7600 transmission electron microscope (TEM) at an accelerating voltage of 120 kV and 10 mA.

Figure 10:
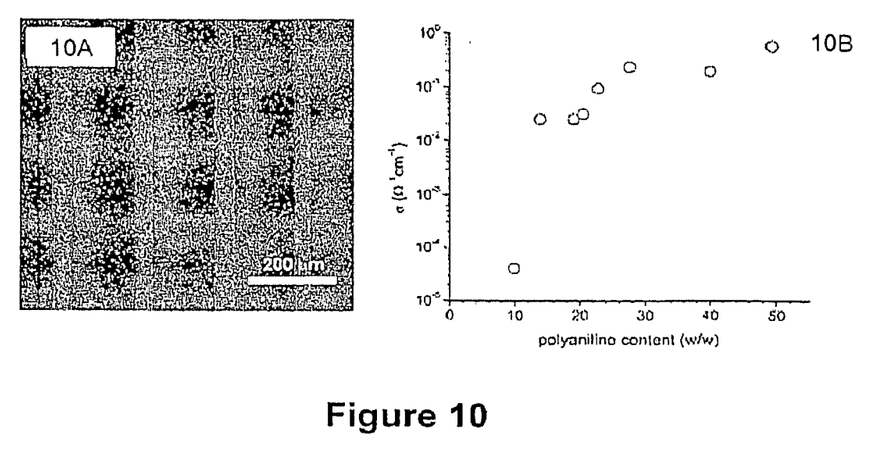
FIG. 10A is an SEM of a portion of an interdigitated test figure with a line width of about 40 μm.
FIG. 10B graphically illustrates the conductivity of printed inks including PANI-coated PBMA core/shell particles mixed with neat PBMA particles.

Scanning electron microscopy was done with a Hitachi S-4800 Field Effect Scanning Electron Microscope (FE-SEM) at a working voltage of 5-10 kV. FIG. 10A is an SEM of an interdigitated test figure with a line width of about 40µm.

A differential scanning calorimeter (TA Instruments DSC 2920) equipped with liquid nitrogen cooling accessories was employed for identifying $T_g$. The carrier gas was nitrogen at a flow rate of about 60 mL/min. Scans were made from −30° C. to 100° C. at a scanning rate of 10° C./min. Thermal gravimetric analysis (TA Instruments TGA 2950) was carried out under a nitrogen purge from 20° C. to 900° C. at a rate of 20° C./min. Molecular weights of the PBMA colloid were determined by GPC (THF at 1.0 ml/min) in 1 mg/ml solution in THF using a Waters 515 pump, four 7.8×300 µm Styragel™ columns (HR-2, 3, 4, 6) and a Waters 2414 refractive index detector. Reported molecular weights are relative to narrow distribution polystyrene standard (M, =2330–980,000). Results are shown in FIG. 11B for PANI particles 101, PBMA particles 102, and PANI-coated PBMA particles 103.

As can be seen with reference to FIG. 11B, the pure PBMA particles decomposed at an onset temperature of about 275° C. and were completely volatilized by about 450° C. The pure PANI particles had a lower onset temperature for decomposition of about 150° C., indicative of the early volatilization of dopant. The highly conjugated structure of the PANI results in the carbonization of the polymer with heating, producing a large quantity of char at 900° C. The PANI-coated PBMA particles exhibited an onset to decomposition temperature that was slightly higher that that of pure PBMA. The influence of the shell was evident with almost 13% w/w of char remainingat 900° C. in the PANI-coated PBMA core/shell particles. The observed content of PANI in the core/shell particles was about 49% w/w.

The zeta potential of the particles were measured over a range of pH values with ZetaPlus seta potential analyzer (Brookhaven Instruments Corp.). Results are shown in FIG. 11C for PBMA particles 202 and the PANI-coated PBMA particles 203. The zeta potential is herein defined to refer to the electric potential at the imaginary shear plane separating the thin layer of liquid bound to the solid surface of the particles that exhibits elastic-like behavior and the rest of the liquid that exhibits normal viscous behavior. A general rule is that a colloid is stable due to the mutual electrostatic repulsion of the particles when the absolute value of the zeta potential is greater than about 30 mV. The initial uncoated PBMA particles exhibited a high level of stability at pH values between about 3 and about 9, with the zeta potentials in this range of pH falling under −50 mV. The addition of the PANI shell to the particles moderately decreased their stability (see11C) as suggested by the drop in the absolut4e value of the zeta potential of the coated particles. The coated particles exhibit zeta potentials falling between −8 mV and −50 mV in the pH range, with relatively stable particles at pH values greater than about 5.

The conductivity of the printed zone was measured with an Alessi C4S four-point head mounted on an Alessi CPS-05 contact probe station. Current was supplied to the head with a Keithley 220 programmable current source and voltage drop across the samples was measured with a Keithley 2000 digital multimeter. The applied current ranged from 1 to 4 mA. FIG. 10B illustrates the results of various printed ink compositions that varied from one another according to an amount of neat PBMA particles included in the formUlation that resulted in a varying amount of polyaniline content in the ink, as shown in the graph.

FIG. 12 presents both the SEM micrograph of a printed zone after heat treating (FIG. 12A), and the thermophysical properties of the particles. Specifically, the printed zone formed as described above was heat treated for 3 hours at 60° C. As can be seen, for instance with reference to FIG. 8B, the heat treatment has led to a change in the morphology of the printed zone, and the polymer particles have adjested their geometric characteristics. The glass transition temperature of the PBMA cores was found to be about 35° C. (FIG. 12B) and is clearly discernable in the DSC trace of the PANI-coated PBMA particles.

FIG. 12C shows the conductivity ratio of the printed zones following the heat treatment and compression at 10 kpsi for 2 seconds (conductivity was measured at 15° C. and normalized relative to initial value). As can be seen, heating and compression of the printed zone resulted in a decrease in the room temperature conductivity. The drop in measured conductivity was enhanced as the thermal treatment was performed at temperatures that progressively deviated from the $T_g$ of the PBMA. It is believed that the viscosity of the PBMA was reduced with the elevated temperatures and during the short compression time, a higher level of flow occurred and assisted in disrupting the conductive network of the polyaniline shell, resulting in the decrease in measured conductivities.

All data were taken at a temperature of 23° C. unless otherwise noted.

It will be appreciated that the foregoing examples, given for purposes of illustration, are not to be construed as limiting the scope of this disclosure.

Although only a few exemplary embodiments have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure which is herein defined and all equivalents thereto. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. An ink comprising a dispersion of particles in a carrier liquid, the particles comprising a polymeric core less than about 500 nm in average diameter, the particles further comprising a polymeric shell including a conductive polymer, the ink including as a binding agent the polymeric material of the polymeric core, the ink further including uncoated core particles.

2. The ink of claim 1, wherein the polymeric shell is between about 10 nm and about 100 nm in thickness.

3. The ink of claim 1, wherein the carrier liquid is aqueous.

4. The ink of claim 1, wherein the carrier liquid comprises alcohol.

5. The ink of claim 1, the particles further comprising an anchoring material between the polymeric core and the polymeric shell.

6. The ink of claim 1, wherein the polymeric core comprises an insulating polymer.

7. The ink of claim 1, wherein the polymeric core has a glass transition temperature of between about 25° C. and about 50° C.

8. The ink of claim 1, wherein the polymeric core comprises a polymer selected from the group consisting of poly(methacrylate), poly(acrylate), poly(ethylene glycol), and an aromatic vinyl polymer.

9. The ink of claim 8, wherein the polymeric core comprises a poly(methacrylate).

10. The ink of claim 9, wherein the polymeric core comprises poly(butyl methacrylate).

11. The ink of claim 1, wherein the polymeric shell comprises a polymer selected from the group consisting of poly (aniline), polypyrrole, polythiophene, poly(ethylenedioxythiophene), and poly(p-phenylene vinylene).

12. The ink of claim 11, wherein the polymeric shell comprises poly(aniline).

13. The ink of claim 1, wherein the ink is a flexographic ink.

14. The ink of claim 1, wherein the ink contains the particles in an amount of up to about 50% by weight of the ink.

15. A method for forming the ink of claim 1 comprising:
  forming a dispersion of polymeric core particles, the polymeric core particles having an average diameter of less than about 500 nm;
  polymerizing a monomer on the polymeric core particles to form a polymeric core/shell particles, wherein the polymeric shell comprises a conductive polymer; wherein the ink comprises a dispersion of the core/shell particles in a carrier liquid.

16. The method of claim 15, further comprising polymerizing a monomer from solution to form the polymeric core particles.

17. The method of claim 16, wherein the polymerization is an emulsion polymerization process.

18. The method of claim 16, wherein the monomer is a methacrylate.

19. The method of claim 18, wherein the monomer is butyl methacrylate.

20. The method of claim 15, further comprising dispersing the core/shell particles in the carrier liquid.

21. The method of claim 15, further comprising adsorbing a stabilizer onto the polymeric core particles.

22. The method of claim 15, further comprising adding an amount of uncoated polymeric core particles to the ink.

23. The method of claim 15, wherein the only binder included in the ink is the polymeric material forming the polymeric core particles.

24. An ink comprising a dispersion of particles in a carrier liquid, the particles comprising a polymeric core less than about 500 nm in average diameter, the particles further comprising a polymeric shell including a conductive polymer, the ink including as a binding agent the polymeric material of the polymeric core, wherein the ink is a flexographic ink and has a viscosity of less than about 100 mPaS.

25. The ink of claim 24, wherein the polymeric shell is between about 10 nm and about 100 nm in thickness.

26. The ink of claim 24, wherein the carrier liquid is aqueous.

27. The ink of claim 24, wherein the carrier liquid comprises alcohol.

28. The ink of claim 24, the particles further comprising an anchoring material between the polymeric core and the polymeric shell.

29. The ink of claim 24, wherein the polymeric core comprises an insulating polymer.

30. The ink of claim 24, wherein the polymeric core has a glass transition temperature of between about 25° C. and about 50° C.

31. The ink of claim 24, wherein the polymeric core comprises a polymer selected from the group consisting of poly (methacrylate), poly(acrylate), poly(ethylene glycol), and an aromatic vinyl polymer.

32. The ink of claim 31, wherein the polymeric core comprises a poly(methacrylate).

33. The ink of claim 32, wherein the polymeric core comprises poly(butyl methacrylate).

34. The ink of claim 24, wherein the polymeric shell comprises a polymer selected from the group consisting of poly (aniline), polypyrrole, polythiophene, poly(ethylenedioxythiophene), and poly(p-phenylene vinylene).

35. The ink of claim 34, wherein the polymeric shell comprises poly(aniline).

36. The ink of claim 24, the ink further including uncoated core particles.

37. The ink of claim 24, wherein the ink contains the particles in an amount of up to about 50% by weight of the ink.

* * * * *